United States Patent [19]

Sun et al.

[11] 4,166,388
[45] Sep. 4, 1979

[54] RF ADMITTANCE MEASURING METHOD AND APPARATUS FOR DETERMINING THE LEVEL OF A CONDUCTIVE LIQUID

[75] Inventors: Robert J. Sun, Bala Cynwyd; Frederick L. Maltby, Jenkintown, both of Pa.

[73] Assignee: Drexelbrook Controls, Inc., Horsham, Pa.

[21] Appl. No.: 859,475

[22] Filed: Dec. 12, 1977

Related U.S. Application Data

[62] Division of Ser. No. 532,208, Dec. 12, 1974, Pat. No. 4,064,753.

[51] Int. Cl.² ............................................. G01F 23/26
[52] U.S. Cl. ................................................. 73/304 R
[58] Field of Search ................... 73/304 C, 304 R, 215

[56] References Cited

U.S. PATENT DOCUMENTS

| | | | |
|---|---|---|---|
| 2,852,937 | 9/1958 | Maze | 73/304 C |
| 3,269,180 | 8/1966 | Schreiber | 73/304 C UX |
| 3,324,647 | 6/1967 | Jedynak | 307/232 X |

FOREIGN PATENT DOCUMENTS

819711  9/1959  United Kingdom .................. 73/304 C

Primary Examiner—Jerry W. Myracle
Attorney, Agent, or Firm—Woodcock, Washburn, Kurtz & Mackiewicz

[57] ABSTRACT

Various probes which are adapted to measure the liquid level in a vessel including the flow rate through a channel comprise a conductive probe electrode and guard electrode means including a rear portion located between the wall of the vessel and the probe electrode and a lateral portion extending outwardly from the lateral extremities of the probe electrode. The probe electrode and the guard electrode means are separated by interior solid insulation and an exterior solid insulation covers the probe so as to separate the guard electrode means and the probe electrode from the conductive liquid. By driving the guard electrode means at substantially the same potential as the probe electrode, the portion of a conductive coating which has accumulated at the lateral portions of the guard electrode means may be capacitively coupled to the potential of the guard electrode means thereby reducing the adverse effect of a conductive coating which has accumulated at the probe electrode.

8 Claims, 37 Drawing Figures

RF ADMITTANCE MEASURING METHOD AND APPARATUS FOR DETERMINING THE LEVEL OF A CONDUCTIVE LIQUID

This application is a division of Ser. No. 532,208, filed Dec. 12, 1974 now U.S. Pat. No. 4,064,753.

BACKGROUND OF THE INVENTION

This invention relates to an improved method and apparatus for the RF measurement of conductive liquid levels in a vessel, and in particular, to the measurement of flow rates through flow channels by measuring the level of the conductive liquid in a flow channel such as a flume or weir.

U.S. Pat. No. 3,269,180—Schreiber discloses a sensing element or probe for measuring the flow rate through a flow channel. In order to properly correlate the flow rate with the head height level of liquid in the flow channel, the probe electrode of the Schreiber patent is characterized such that connection of the probe to an appropriate electronic unit will produce an output which is linear with the flow rate.

Figure 1:
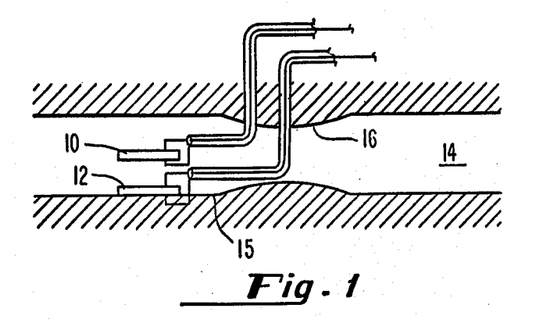
FIG. 1 is a top plan view of a flow channel having a restriction therein with flow rate sensing probes mounted in a channel.

In probe electrodes of the type shown in the Schreiber patent, accumulation of a coating is a very substantial problem. For example, if the coating accumulates on the probe of FIG. 1b where the conductive backing or guard shield is connected to ground, the capacitance of the coating will be resistively coupled around the sides of the probe to ground thereby producing an erroneous reading of the head height and thus the flow rate.

In U.S. Pat. Nos. 3,781,672—Maltby et al. and 3,706,980—Maltby, both of which are assigned to the assignee of this invention, systems are disclosed for immunizing capacitance measuring probes from the effects of coatings. This is accomplished by providing a guard shield which is exposed to the materials being measured and driven at the same potential as the probe electrode so as to maintain the accumulated coating at substantially the same potential as the probe electrode and thereby eliminating its effects on any capacitance measurement. However, the guard element of FIGS. 1b and 1f of the Schreiber patent could not be driven at the same potential as the probe electrode where the probes are mounted on the wall or an otherwise grounded support member of the flow channel since the guard element would be grounded. Even if it could be driven at the potential of the probe electrode, this would not eliminate the adverse effects of the coating since the driven guard electrode which is at the rear of the probe would not be closely coupled to the coating at the front of the probe due to the presence of a rather thick insulation from back-to-front of the probe. As a result, the capacitance of the coating would be resistively coupled to the wall of the flow channel which is effectively coupled to ground through the conductive liquid in the flow channel and would thereby enter into the capacitance measurement.

U.S. Pat. No. 3,729,994—Klug, like the Schreiber patent, discloses a curved and characterized probe for measuring the flow rates through a flow channel. However, unlike the Schreiber patent, the Klug patent does not disclose a conductive backing or a guard electrode of any kind other than a dielectric medium intended to immunize the probe electrode from any changes in capacitance through the rear of the probe. The probe electrode is insulated from the conductive liquid within the flow channel at the front of the probe by Teflon, presumably of sufficient thickness so as to avoid "cut-through" by the materials and debris flowing in the flow channel. However, Teflon has a relatively low dielectric constant of approximately 2.2 which would provide less than the optimal capacitive coupling of any coating to a guard electrode if a sufficient Teflon thickness were utilized to avoid "cut-through".

U.S. Pat. No. 2,852,937—Maze discloses a probe adapted to be mounted on the wall of a container for measuring the level of a conductive liquid within the container. The probe includes a probe electrode and a shield electrode located behind and extending somewhat laterally outwardly beyond the lateral extremities of the probe electrode. However, the shield electrode is not closely capacitively coupled to the conductive liquid. The insulation itself comprises Teflon which, in combination with the spacing of the shield from the surface of the insulation, substantially precludes any close coupling of a coating to the shield.

U.S. Pat. No. 3,324,647—Jedynak discloses a pair of isolator plates behind and extending laterally outwardly beyond a probe electrode. There is no suggestion that either of the isolator plates is driven at the same potential as the probe electrode nor is there any suggestion of a close coupling between a coating on the surface of the probe and the isolator plates.

SUMMARY OF THE INVENTION

It is an object of this invention to provide an improved apparatus for measuring the level of a conductive liquid in a vessel or container.

It is a more specific object of this invention to provide an improved apparatus for measuring level or flow rates of a conductive liquid or other fluid in a vessel or flow channel such as a weir or flume.

It is a further specific object of this invention to provide an improved apparatus for measuring the level of the fluid in a vessel where the measuring probe may be mounted flush with the wall of the vessel so as not to adversely affect or be adversely affected by the flow or movement of the fluid in the vessel.

It is a still further specific object of this invention to provide an improved apparatus for measuring the level of the fluid in a vessel where the measuring probe is mounted flush with the wall of the vessel so as not to collect fibrous materials at the probe which may adversely affect the measurement or adversely affect the flow of the fluid.

It is a further object of this invention to provide an improved apparatus wherein the probe may be mounted on the wall of the vessel without any adverse effects from an accumulated coating of the fluid on the probe.

It is a further object of this invention to provide an improved apparatus wherein the probe generally conforms with the curve at the wall of the vessel or flow channel.

It is also an object of this invention to provide an improved apparatus wherein the probe may be readily installed within an existing vessel or flow channel.

It is also an object of this invention to provide an improved apparatus wherein changes in the dielectric constant of the insulation material in the measuring probe will not adversely affect the measurement of a conductive liquid level.

It is a further object of this invention to provide an improved method and apparatus wherein the probe is capable of detecting the presence of an unwanted insulating coating on the probe and eliminate the effects of that coating on the level measurement.

It is a further object of this invention to provide an improved method and apparatus wherein the foregoing objects are achieved without sacrificing the ability of the probe to resist the abrading effect of materials which may pass through a flow channel.

It is also an object of this invention to provide an improved method and apparatus wherein a probe may be readily calibrated.

In accordance with these and other objects, an RF probe system for measuring the level of a liquid comprises a vessel, a probe including a conductive probe electrode extending longitudinally along the probe and insulation covering the probe electrode, and track means in the vessel adapted to removably receive and guide the probe along the predetermined path.

In accordance with one important aspect of the invention, a probe is flexible along the longitudinal length thereof so as to conform with any curvature in the predetermined path. Where the predetermined path comprises a curvature, the probe extends in both the vertical and horizontal direction. The probe may be characterized by an equation consistent with the curvature.

The track means comprises continuous surfaces extending along the length of the probe so as to form a longitudinally extending groove. The edges of the continuous surfaces are adapted to cover the lateral extremities of the probe with a central opening exposing the probe substantially along the longitudinal length of the probe.

BRIEF DESCRIPTION OF THE DRAWINGS

FIGS. 5(a-g) are schematic representations of probes and probe potentials utilized in explaining the advantages of a probe such as that shown in FIGS. 3 and 4;

FIGS. 12 (a-e) depict a method of making the probe of FIGS. 10 and 11;

DETAILED DESCRIPTION OF THE PREFERRED EMBODIMENTS

Figure 2:
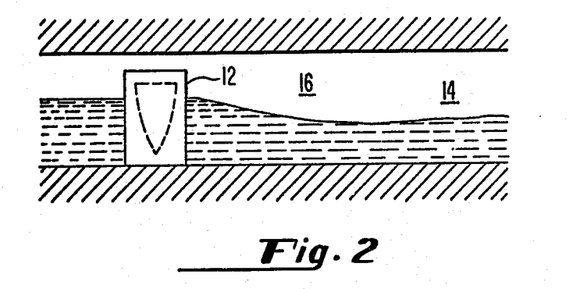
FIG. 2 is a side view of the flow channel of FIG. 1.

As shown in FIGS. 1 and 2, flow rate sensing probes 10 and 12 are mounted with the longitudinal axis of the probe extending vertically into the grounded liquid flowing within a flow channel 14 having a restriction 16 therein. As the flow rate of the liquid through the channel increases and decreases, the head height within the flow channel rises and falls.

Figures 3, 4:
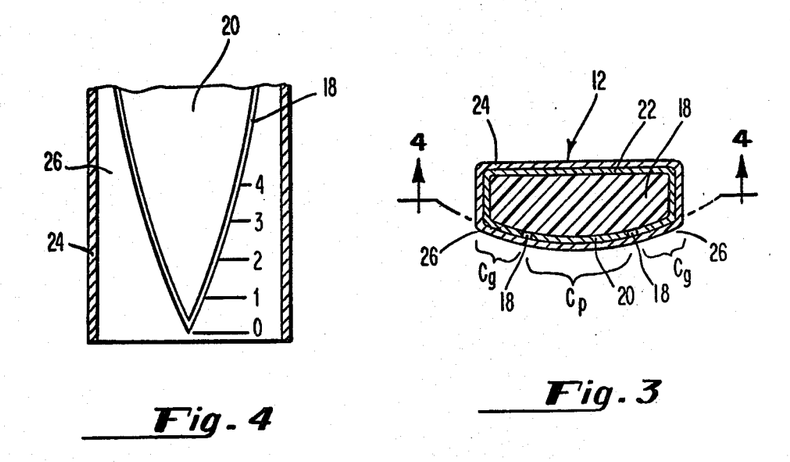
FIG. 3 is a sectional view of a flow rate sensing probe constructed in accordance with this invention.
FIG. 4 is a frontal view taken along line 4—4 of FIG. 3.

A preferred embodiment of an RF admittance sensing probe adapted to be utilized as the probe 12 mounted on a grounded wall or surface 15 of the flow channel 14 in FIG. 1 will now be described in detail with reference to FIGS. 3 and 4. As shown in FIGS. 3 and 4, the probe comprises an insulating substrate 18 having a conductive probe electrode 20 extending longitudinally along the front of the probe. The probe further comprises a conductive guard electrode 22, adapted to be driven at the same potential as the probe electrode 20, which extends longitudinally along the back of the probe with the substrate 18 between the probe electrode 20 and the guard electrode 22.

In accordance with one important aspect of the invention, the conductive guard electrode 22 extends laterally outwardly from behind the probe electrode 20 at opposite lateral extremities thereof and around to the front of the probe 12 so as to closely couple any coating of conductive liquid which accumulates on the probe 12 to the potential of the guard electrode 22 and precludes resistive coupling of the conductive coating around the sides of the probe to the wall 15 of the flow channel which is effectively grounded. The close coupling of the coating at the sides of the probe 12 near the guard electrode 22 is assured by providing an exterior solid insulation means in the form of a sleeve 24, which may be of the heat-shrunk type, such that the capacitance $C_g$ from the guard electrode to the surface of the probe is substantial with respect to, i.e., at least 50% as great as, the capacitance $C_p$ of the insulating cover 24 from the frontal surface of the probe electrode 20 to the frontal surface of the insulating cover 24. Note that due to the uniform thickness of the sleeve 24, the capacitance through the sleeve 24 per unit area at the guard electrode 22 will be equal to the capacitance through the sleeve 24 per unit area at the probe electrode 20.

By eliminating the resistive coupling around the probe, the capacitance to ground as measured by the probe electrode 20 may be measured in accordance with the technique disclosed in U.S. Pat. No. 3,746,975—Maltby, assigned to the assignee of this invention, which eliminates the effects of the coating accumulated on the probe. The basis for this measuring technique disclosed in U.S. Pat. No. 3,746,975 is that a coating, after a certain length, will act as an infinite transmission line whose characteristic terminal impedance is predictable. The resistive and capacitive components are measured, and the effects of the coating can be computed and eliminated. The above is true assuming the resistive coupling extends longitudinally along the sensing element of the probe to the conductive liquid being measured rather than around the probe to a grounded wall. Since the conductive guard electrode 24 with its frontal portion 26 closely coupled to the coating will prevent resistive current from flowing around the probe, the coating will appear as a model of the infinite transmission line enabling the use of the technique disclosed in the aforesaid U.S. Pat. No. 3,746,975.

In further accordance with this invention, the probe electrode 20 is characterized, i.e., the lateral dimension of the probe electrode decreases with decreasing distance from one longitudinal end of the probe as shown in FIG. 4. Furthermore, the frontal portion 26 of the probe is also characterized in that the lateral dimension of the frontal portion increases with decreasing distance from the longitudinal end of the probe. As a result of the characterized nature of the frontal portion of the guard electrode, the resistive coupling of the coating on the probe increases as the head height of the liquid decreases so as to further reduce the effects of the resistive coating on the capacitance measurement.

It will be understood that the probe electrode may be characterized so as to accurately read the flow in the particular channel in which the probe is mounted. In this connection, the probe may be characterized by the following equation $$b = k_1 \alpha H^{(\alpha - 1)} \quad (1)$$

where
 b = the width of the probe;
 $k_1$ = a constant;
 $\alpha$ = a constant depending upon the shape of the flow channel;
 H = the height of the stream above the zero flow level; and
the flow through the channel may be expressed by the equation $$Q = k_1 H^\alpha \quad (2)$$

For a full understanding of the importance of the guard electrode 22 with its frontal portions 26, reference may be made to FIGS. 5(a-g) which depict probes having coatings and the effects of the coatings on the probe measurement. As shown in FIG. 5a, a non-characterized probe electrode p having an insulated cover is placed in a conductive liquid l. As the level of the conductive liquid l falls, a coating c is left on the probe electrode p. As shown in FIG. 5a, the probe electrode p is mounted away from the conductive wall of the vessel or flow channel, i.e., the probe p is mounted in the position of the probe 10 shown in FIG. 1.

Figure 5A:
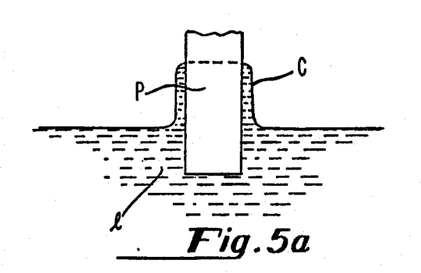
Figure 5B:
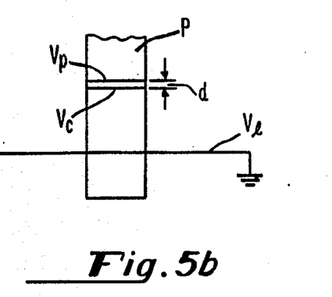

As shown in FIG. 5b, the potential or voltage of the coating c in FIG. 5a represented by the line $v_c$ is substantially constant along the width or lateral dimension of the probe p and only slightly below (a potential drop d) the potential or voltage $v_p$ of the probe itself. Since the liquid l is conductive, and the liquid l is contained in a grounded vessel or flow channel, the potential level of the liquid l is represented by the line $v_l$ which is maintained at ground. It will be seen from FIG. 5b that the coating itself has very little effect on the probe measurement since the potential seen by the probe electrode p above the liquid level l is substantially the same as the potential $v_p$ of the probe itself as long as the probe is not mounted against a grounded wall or support member in the vessel or flow channel.

Figure 5C:
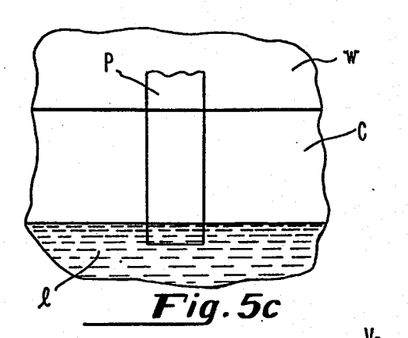

FIG. 5c depicts the mounting of the probe p against a wall w such that a coating of the liquid l extends across the probe electrode p and along the wall w. Since the coating c is again conductive, the coating c provides a resistive path to ground from the probe electrode p to the grounded liquid l.

Figure 5D:
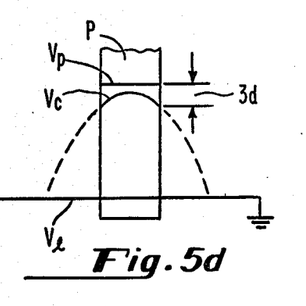

As shown in FIG. 5d, the coating c of FIG. 5c which provides a path to ground having a relatively small resistance produces a very substantial coating error since the probe potential $v_p$ as shown in FIG. 5d remains the same but the coating potential $v_c$ droops considerably toward ground at the lateral extremities (a potential drop of 3d). Thus, a worse coating error results when the probe is mounted along the wall of the vessel than when the probe is mounted away from the wall for the same thickness of coating c and the same width or lateral dimension of the probe p.

Figure 5E:
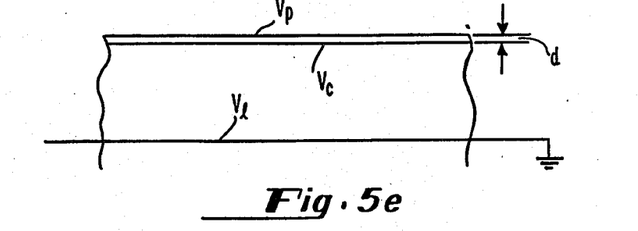

From FIG. 5e, it will be appreciated that a probe of infinite width may be mounted along the wall of the vessel or flow channel without a substantial coating error. As shown in FIG. 5e, the coating potential $v_c$ is substantially constant and only slightly below the probe potential $v_p$ (a drop of d) along the entire width of the probe. However, from a practical standpoint, it is not possible to give the probe infinite width. This is particularly true where the probe electrode must be characterized as in the case of the probe shown in FIGS. 3 and 4 so as to provide an indication of flow rate through a flow channel. In such a case, the probe electrode becomes extremely narrow at the lower end thereof.

Figure 5F:
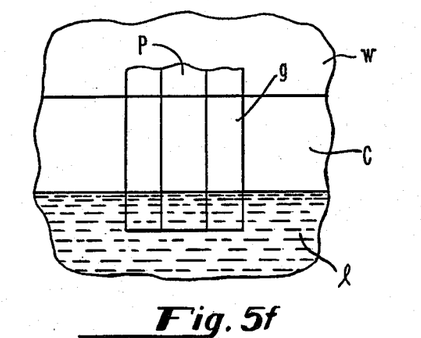
Figure 5G:
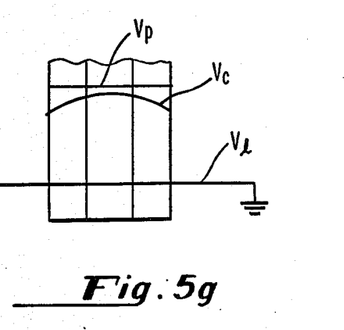

By providing a guard electrode g as shown in FIG. 5f at the lateral extremities of the probe electrode p and the wall w, the advantages of a relatively wide probe electrode are achieved without making the probe electrode p itself excessively wide. Since the guard electrode g is driven at substantially the same potential as the probe electrode p, the potential $v_c$ as shown in FIG. 5g droops across the entire width of the probe electrode p plus the guard electrode g. However, the actual droop at the lateral extremities of the probe electrode p is not great, i.e., the potential $v_c$ at the lateral extremities is no more than 25% of the potential drop between $v_c$ at the center of the probe p and the potential $v_p$ of the probe electrode itself. As shown in FIG. 5g, the potential $v_c$ at the probe electrode p is substantially constant and only slightly below the potential $v_p$ of the probe electrode p itself thereby minimizing the coating error. Preferably, the droop (i.e., the drop in the potential $v_c$ from the center of the probe electrode p to the lateral extremity) is less than the voltage drop between $v_p$ and $v_c$ at the center of the probe.

From the foregoing, the following conclusions may be reached. First, the sensing or probe electrode p should be as wide as possible so that the capacitive coupling through the insulation covering the probe electrode is as high as possible. In addition, the guard electrode g should extend between the lateral extremities of the probe electrode p and any adjacent wall so as to be as well coupled to the coating as possible without loading. For purposes of this invention, the guard electrode g is considered closely coupled to the conductive liquid when the capacitive coupling is at least 50% of the capacitive coupling between the liquid and the probe electrode p. In general, it has been found that the lateral portions which extend laterally outwardly a substantially greater distance than the minimum thickness of the exterior insulation provide the necessary close coupling. Typically, the distance is greater than the spacing between the lateral portions of the guard electrode and the probe electrode plus the thickness of the guard electrode. Preferably, the distance is at least six times greater than the thickness of the exterior insulation covering the guard electrode divided by the dielectric constant of the exterior insulation. Of course, for the characterized probes of FIGS. 3 and 4, the lateral extension will vary as a function of distance from the end of the probe. However, the distance of "six times" is applicable over the entire measuring length of the probe or at least a substantial portion thereof.

Figure 6:
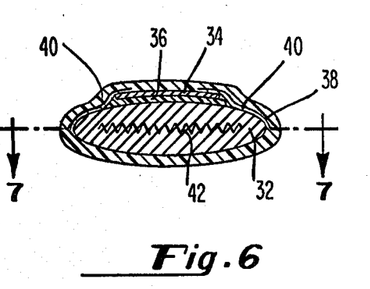
FIG. 6 is a sectional view of another sensing probe constructed in accordance with this invention.
Figure 7:
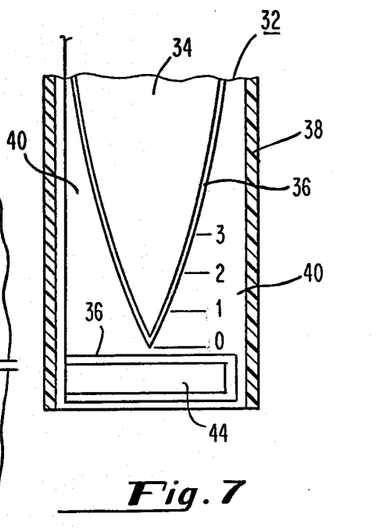
FIG. 7 is a frontal view taken along line 7—7 of FIG. 6.

Another embodiment of a probe constructed in accordance with the principles of this invention is disclosed in FIGS. 6 and 7. As shown there, a backing or guard electrode 32 comprises a conductive substrate which is relatively thick, as measured from front-to-back, as compared with a probe electrode 34 and intermediate insulation material 36. In the embodiment of FIGS. 6 and 7, the thick guard electrode substrate 32 provides the mechanical strength for the probe, which mechanical strength is provided by the thick insulating substrate 18 in the probe of FIGS. 3 and 4. Note that any coating which accumulates on the probe in FIGS. 6 and 7 adjacent frontal portions 40 of the guard electrode will be closely coupled to the potential of the guard electrode due to the fact that the only insulation between the coating and the guard electrode 32 is a sleeve 38 and frontal portions 40 of the guard electrode 32. As a result, the capacitance $C_g$ through the frontal portions 40 is not substantially less than the capacitance $C_p$ to the probe electrode 34 through the cover 38. The guard electrode substrate 32 has a curved frontal surface so as to permit the use of a heat-shrunk tube for the sleeve 38 which will minimize the air spaces between the guard electrode 32 and the sleeve 38.

In accordance with another important aspect of the invention, the conductive guard electrode 32 encloses a heating coil 42 which is adapted to heat the overall probe structure to a temperature so as to prevent the accumulation of a coating, e.g., grease, on the probe. Where the supply of power available is limited, it may be desirable to only activate the heating element 42 if a predetermined thickness of grease has accumulated on the probe. This may be accomplished by providing an additional sensing electrode 44 as shown in FIG. 7 which is covered by the sleeve 38. By locating the electrode 44 beneath the longitudinal end of the probe electrode 34, the sensing electrode 44 will be in a position to detect a grease build-up even though the level of the liquid in the flow channel is relatively low. By periodically dispersing any grease build-up, the indicia on the probe remain visible.

Figure 8:
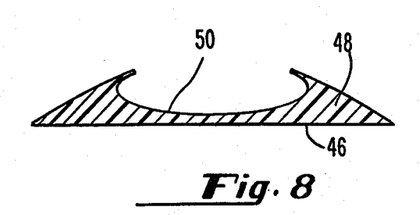
FIG. 8 is a sectional view of a track for mounting the probe of FIGS. 6 and 7.
Figure 9:
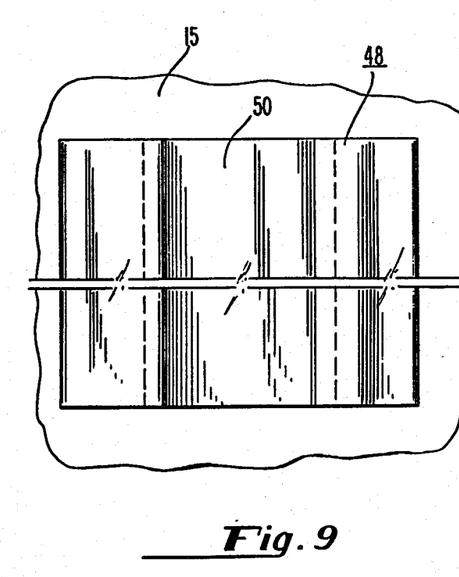
FIG. 9 is a frontal view of the track shown in FIG. 8 mounted on the wall of a flow channel.

FIG. 8 discloses a track 48 having a surface 46 for mounting on the wall 52 of a flow channel as shown in FIG. 9. The track includes a concave recess 50 adapted to receive the probe of FIGS. 6 and 7. When the track is mounted such that the longitudinal axis of the concave recess or groove 50 extends longitudinally vertically up the wall 52 of the flow channel, the probe of FIGS. 6 and 7 may be moved and guided vertically through the track by the continuous surfaces thereof to assist in calibrating the probe.

Figure 10:
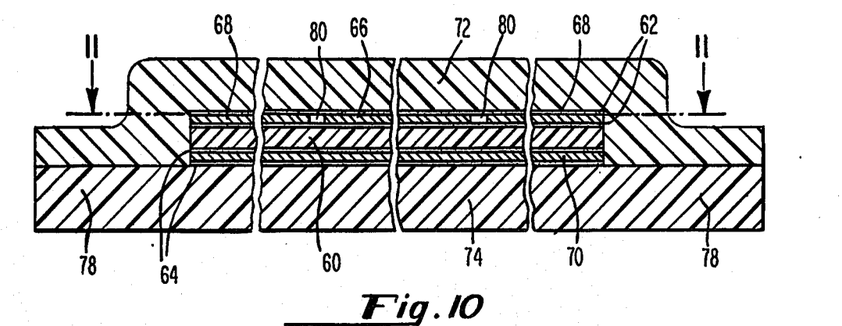
FIG. 10 is a sectional view of another sensing probe constructed in accordance with this invention.
Figure 11:
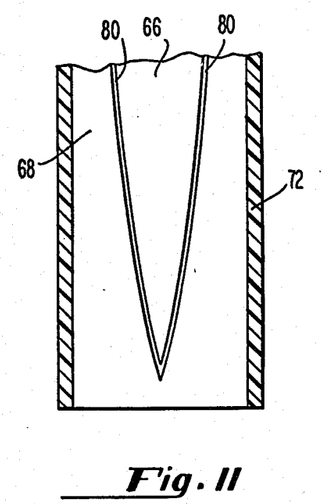
FIG. 11 is a frontal view taken along line 11—11 of FIG. 10.

Another embodiment of the probe constructed in accordance with the principles of this invention is disclosed in FIGS. 10 and 11. This probe, which is relatively inexpensive to produce, comprises a laminated structure including an interior insulation substrate 60 with inner adhesive layers 62 and 64 which bond a probe electrode 66 and frontal guard electrode 68 to the front of the substrate 60 and a rear guard electrode 70 to the rear of the substrate 60. The foregoing structure is then sandwiched between two sheets of exterior insulation 72 and 74 with outer adhesive layers 62 and 64 in between which are heat sealed to one another along edges 78. As shown in FIG. 11, the probe electrode 66 is characterized and separated from the frontal guard electrode 68 by a slight space 80. A probe of this type may be very thin, i.e., less than ⅜ inch thick and preferably less than 1/16 inch thick.

Figure 12A:
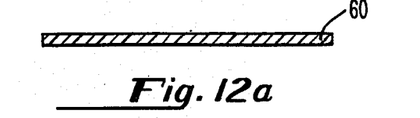
Figure 12B:
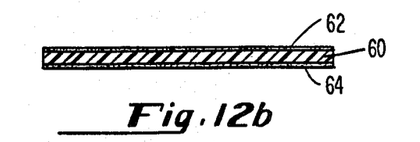
Figure 12C:
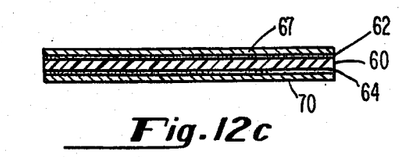
Figure 12D:
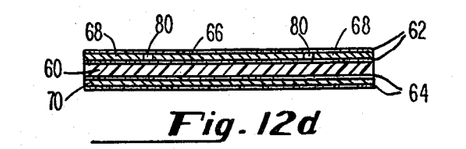
Figure 12E:
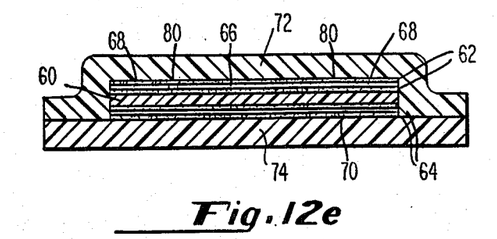

A method for making the probe of FIGS. 10 and 11 will now be described with reference to FIGS. 12(a–f). The bare substrate 60 as shown in FIG. 12a is first coated with the inner adhesive layers 62 and 64 such as a polyester adhesive film as shown in FIG. 12b. Next, a copper film 70 and a copper film 67 are applied over the adhesive layers 62 and 64 as shown in FIG. 12c. At this time, the film 67 may be etched to form the probe electrode 66 and the frontal guard electrode 68 as shown in FIG. 12d. The sheets 72 and 74 are then applied over outer adhesive layers 62 and 64 and the entire structure is laminated under heat and pressure as shown in FIG. 12e. The edges of the sheets 72 and 74 are finally heat sealed to each other along the laterial extremities to complete the probe.

One particular advantage of a probe such as that shown in FIGS. 10 and 11 is its flexibility so as to permit it to be mounted in a curved track which conforms with the curvature of the wall in a vessel or flow channel, i.e., extends vertically and horizontally. In this connection, the substrate 60 may comprise Mylar. Mylar provides the necessary flexibility and support for the probe structure while at the same time having a sufficiently low dielectric constant to insulate the probe electrode 66 from the rear guard electrode 70.

Preferably, the exterior insulation sheets 70 and 72 are characterized by high strength so as to resist abrasion and cut-through due to floating debris. At the same time, it is preferable that the sheets 70 and 72 have a very high dielectric constant so as to effectively capacitively couple the potential of the frontal guard electrode 68 to the accumulated coating on the probe adjacent thereto. In this connection, it has been found that a fluorocarbon resin such as crystalline, high molecular weight polymer of vinylidene fluoride having a dielectric in excess of 4 is particularly well suited for use as the exterior insulation of the probe. One particularly good material for this purpose is the high molecular weight polymer of vinylidene fluoride which is supplied by Pennwalt Corporation under the trade name of Kynar. Generally, Kynar is characterized by a dielectric constant of 8 with a good deal of abrasion or cut-through resistance.

The main advantage of using a high performance fluorocarbon resin such as Kynar in a probe such as that shown in FIGS. 10 and 11 is that the combination of its mechanical and electrical characteristics enable the system to ignore coatings which are developed on the probe. The degree to which the coatings can be ignored is dependent upon the measuring technique as described in the aforesaid U.S. Pat. No. 3,746,975 and also the capacity per square inch of the probe insulation. The higher the capacitive coupling of the probe, the smaller the error due to coatings which are deposited on the probe element. In general, the capacitance through insulating material may be expressed by the following equation:

$$c = K_a A K_3 / t_1 \tag{3}$$

where $K_a$ = a constant;
A = the surface area of the insulation;
$K_3$ = the dielectric constant; and
$t_1$ = the thickness of the insulation.

Because Kynar is tough, i.e., resistant to abrasion and "cut-through", it can be very thin. For example, Kynar can be less than one-half as thick as Teflon and still provide the same resistance to "cut-through". In addition, the high dielectric constant of 8 for Kynar as compared with approximately 2.2 for Teflon permits the Kynar to provide a capacitive coupling 3.6 times higher than the same thickness of Teflon. The combined effect of the reduced thickness of Kynar as compared with Teflon and the larger dielectric constant of Kynar as compared with Teflon, allows a Kynar covered probe to have a coupling capacity at least 7 to 8 times higher than a Teflon covered probe. Since the increased ability of the probe to ignore coatings is equal to the square root of the increase in the coupling capacity, a probe made with Kynar will reduce errors due to coating by more than one-third of that encountered by a probe made with Teflon.

From the foregoing, it will be understood that the probe itself should be particularly thin so as to avoid disturbing the flow or movement of the liquid in a vessel. However, a thin probe may be very difficult to mount since it may be so flexible so as to be incapable of self-support, i.e., incapable of resisting deflection when turned at right angles with respect to the flow or movement of liquid in the vessel. Generally, such an incapability exists when the ratio of probe width to thickness is greater than 20 to 1. The addition, it is generally desirable to mount the probe so as to facilitate its removal for replacement, repair and calibration.

Figure 13:
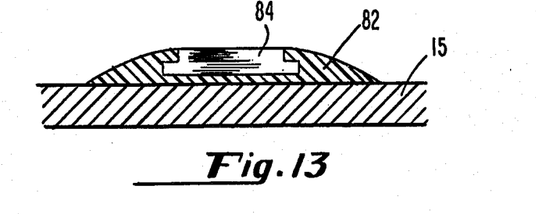
FIG. 13 is a sectional view of the probe of FIGS. 10 and 11 mounted in a track attached to a flow channel.

In accordance with the mounting requirements, the flexible probe of FIGS. 10 and 11 may be inserted into and guided by a track 82 such as that shown in FIG. 13 which has an opening 84 which generally conforms with the shape of the removable probe. The track 82 may then be mounted on the wall 15 of the flow channel even though the wall 15 is curved since the track may be flexible as well as the probe. Note that the opening 84 in the track 82 is adapted to be substantially filled by the probe so as to eliminate any cracks and crevices in which materials might accumulate with the edges of the track convering the lateral extremities of the probe and the central area of the probe exposed through an opening.

Figure 14:
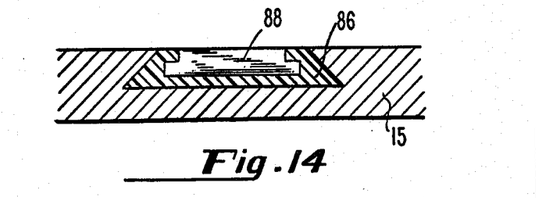
FIG. 14 is a sectional view of the probe of FIGS. 10 and 11 mounted in a track cast within the wall of a flow channel.
Figure 14A:
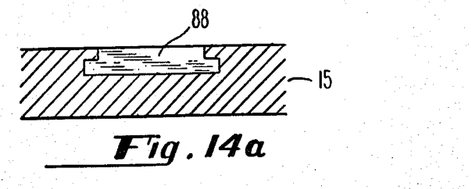
FIG. 14a is a sectional view of the probe of FIGS. 10 and 11 mounted in a track cast from the wall of the flow channel itself.
Figure 15:
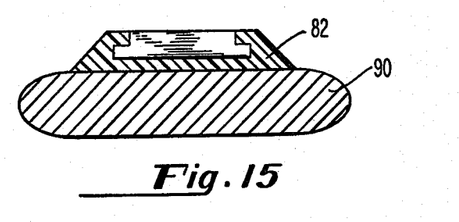
FIG. 15 is a sectional view of the probe and track in FIG. 13 mounted on a mechanical support within a flow channel.

It is also possible to cast a recessed track 86 into the wall 15 as shown in FIG. 14 where the opening 88 through the track conforms with the shape of the removable probe. As an alternative, the wall 15 may itself be formed or molded so as to provide an opening 88 which acts as a recessed track for the probe as shown in FIG. 14a. In FIGS. 14 and 14a, it is particularly desirable to limit the thickness of the probe where the wall 15 is relatively thin. As shown in FIG. 15, the track 82 is mounted on a mechanical support member 90 in a vessel or container. Since the removable probe would include guard electrodes, the support member 90 may be effectively grounded as in the case of the wall 15 in the embodiment of FIGS. 13 and 14. The mechanical support member 90 is tapered at the ends thereof so as to minimize the effect of the support member 90 on the flow through a flow channel.

Figure 16:
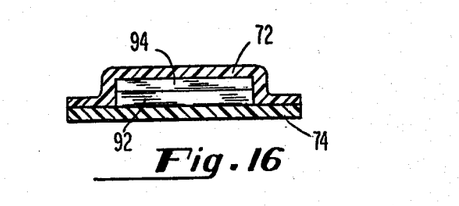
FIG. 16 is a sectional view of the probe of FIGS. 10 and 11 with an integral heating element.
Figure 17:
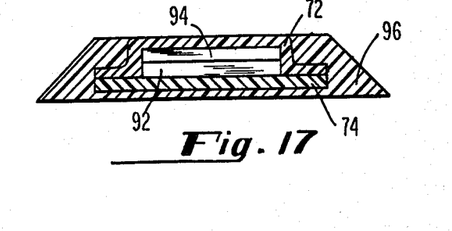
FIG. 17 is a sectional view of the probe of FIG. 16 mounted in a track adapted to be mounted on the wall of the flow channel.

FIG. 16 shows a probe of the type shown in FIGS. 10 and 11 except that a discrete heater element 92 is included in the laminated structure behind the guard electrode 70 but between the insulating sheets 72 and 74. If the heater element 92 which may comprise a suitable resistive heating element is made flexible, the entire structure shown in FIG. 16 may be inserted into the tracks 82 and 86 shown in FIGS. 13, 14 and 15 as shown in FIG. 17. As an alternative, the heating element 92 may be located outside and behind the laminated probe structure within the longitudinal opening 94 of a track 96.

Figure 18:
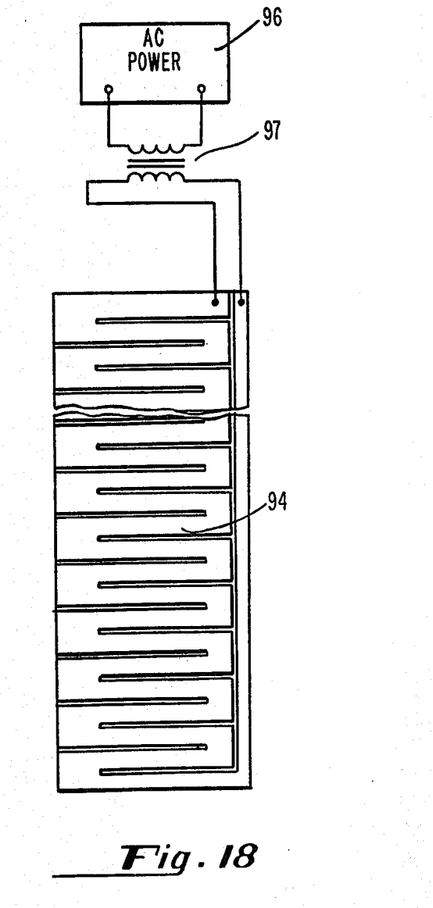
FIG. 18 is a sectional view of an alternative guard electrode for the probe of FIGS. 10 and 11 which may be utilized as a heating element.

As a still further alternative, the rear guard electrode 70 of the probe in FIGS. 10 and 11 may be of a generally serpentine shape so as to provide a combined guard electrode and heating element for the probe. Such a serpentine guard electrode 94 is shown in FIG. 18 in combination with a source of AC power 96 which is coupled to the guard electrode 94 through an isolation transformer 97 with a low capacitive coupling. The guard electrode 94 is also connected to a source of guard potential not shown. As utilized herein, a low capacitive coupling is intended to mean a capacitive coupling with an impedance which is high relative to the impedance of the guard terminal to which the guard electrode is connected.

It will of course be appreciated that the capacitance through the exterior insulation of a probe constructed in accordance with this invention is the capacitance which is measured by the probe since the liquid or materials whose level is being measured is substantially conductive. Thus, any variation in the dielectric constant of the insulation with temperature will produce an error. In accordance with one important aspect of the invention, the probe of the type shown in FIGS. 10 and 11 includes a compensating electrode 98 which is positioned below the lower end of the probe electrode 66 and insulated from the guard electrode by an appropriate spacing which may be achieved by appropriately etching the conductive film which forms the frontal guard electrodes 68 and the probe electrode 66. By measuring the change in the dielectric constant of the exterior insulation 72 not shown in FIG. 19 and utilizing that to compensate and correct the measurement of the capacitance through the insulation 72 juxtaposed to the probe electrode 66 below the level of the conductive liquid, accurate measurements of the liquid level may be achieved. Note that the compensating probe electrode 98 is located in a position which will always remain below the liquid in the vessel or flow channel.

Figure 20:
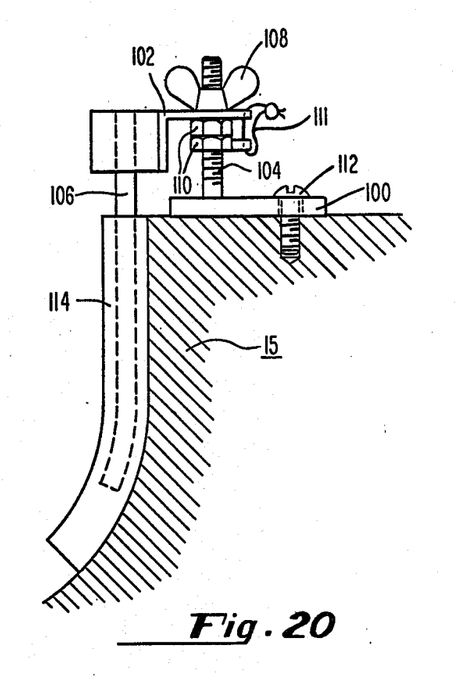
FIG. 20 is a sectional view of means for mounting a probe in a precalibrated position on the curved wall of a flow channel.

In accordance with another important aspect of the invention, a probe of the type shown in FIGS. 10 and 11 may be precalibrated outside of the flow channel and then returned to the flow channel and readily mounted in the appropriate position. As shown in FIG. 20, a mounting apparatus on the wall of the flow channel includes a base plate 100 which supports a mounting bracket 102 on a threaded stud 104. The bracket 102 which is attached by a suitable means to the upper end of the probe 106 may be readily removed from the stud 104 by removing a wing nut 108. Once the probe 106 is removed from the flow channel, it may be inserted into a suitable calibrating vessel so as to establish an appropriate zero level. The probe 106 with the mounting bracket 102 may then be returned to the stud 104 and positioned at the appropriate zero level by moving the nuts 110 to the appropriate position on the stud 104. The wing nut 108 may then be secured to the stud 104 so as to clamp the bracket 102 in the appropriate position. In order to assist in positioning the probe 106 in the zero level position, suitable indicia such as those shown on the probe in FIGS. 4 and 7 may be utilized. The base plate 100 of the mounting means may be attached to the wall 15 by suitable means such as a threaded fastener 112. Note that the probe 106 extends into a track 114 having a curved longitudinal groove and the probe 106 must therefore be flexible enough to follow this groove when inserted into the track. In order to assure that the probe 106 is not raised or lowered with respect to the wall 15, a wire seal 111 is provided which extends between and through openings in the bracket 102 and the lowermost nut 110.

Figure 21A:
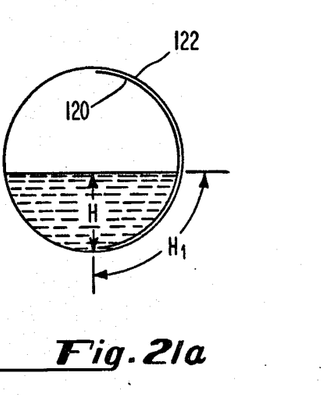
FIGS. 21a and b are schematic representations utilized in explaining the dual characteristics of probes mounted along a curved wall of a flow channel.

As indicated in the foregoing, it is oftentimes desirable to mount a probe so as to conform with a curvature of a wall in a flow channel or other vessel. However, where the probe does follow the curvature of the wall in a flow channel, the probe must be characterized differently from a probe which extends vertically. Consider, for example, the characterization necessary for a probe which is mounted flush against the wall of a circular pipe as schematically depicted in FIG. 21a where the probe 120 extends along half of the pipe 122 and the height H of the liquid within the pipe corresponds with the submerged length $H_1$. R. corresponds to the radius of the pipe. The flow rate through the pipe may be expressed by the equation $$Q = K_4 H^\alpha \quad (4)$$

where $K_4$ is a constant and the width of the probe may be expressed by the equation $$b = K_5 H^{\alpha - 1}$$

where $K_5$ is a constant, keeping in mind that the relationship between H and $H_1$ for a circular pipe is $$[2\pi R]. \quad (5)$$

Figure 21B:
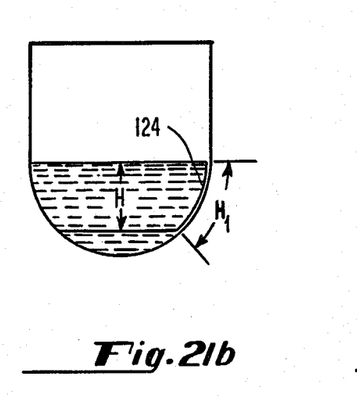

Similarly, for a Leopold Logco flume as shown in FIG. 21b where H represents the height of the stream above the zero level and $H_1$ represents the length of the probe covered by the stream, the flow rate may be expressed by the equation $$Q = K_6 H^{1.547} \quad (6)$$

where $K_6$ is a constant and the width of the probe may be expressed by the equation $$b = K_7 H^{0.547}$$

where $K_7$ is a constant and where $$[2\pi R] \quad (7)$$

below the straight walls of the flume. Assuming that the semicircular portion of the flume has a radius of 3 inches and the width b of the probe is 1 inch at a height H equal to 5 inches, the probe would be characterized as follows:

| $H_1$ | W |
|---|---|
| 0 | 0 |
| .30 | .142 |
| .59 | .272 |
| 1.12 | .407 |
| 1.64 | .516 |
| 2.15 | .582 |
| 2.65 | .584 |
| 3.15 | .757 |
| 4.15 | .85 |
| 5.15 | 1.0 |

This compares with the characterization for a straight probe in the Leopold Logco flume which follows:

| H | W |
|---|---|
| 0 | 0 |
| .25 | .194 |
| .5 | .283 |
| 1.0 | .414 |
| 1.5 | .517 |
| 2.0 | .605 |
| 2.5 | .684 |
| 3.0 | .757 |
| 4.0 | .85 |
| 5.0 | 1.0 |

To readily see that the characterizations are different the relationship between H and W and $H_1$ and $W_1$ can be normalized as shown below:

| H | W | $H_1$ | $W_1$ |
|---|---|---|---|
| 0 | 0 | 0 | |
| .050 | .194 | .058 | .142 |
| .100 | .283 | .115 | .272 |
| .200 | .414 | .217 | .407 |
| .300 | .517 | .318 | .516 |
| .400 | .605 | .417 | .582 |
| .500 | .684 | .515 | .684 |
| .600 | .757 | .612 | .757 |
| .800 | .850 | .806 | .850 |
| 1.00 | 1.000 | 1.00 | 1.000 |

Figure 22:
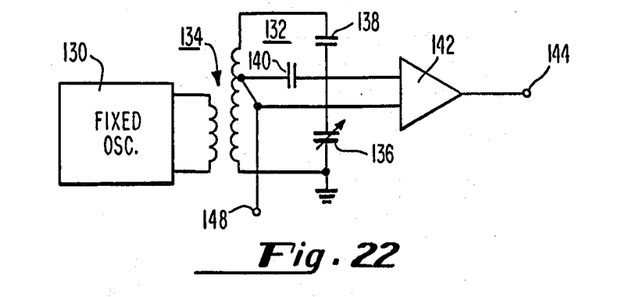
FIGS. 22 and 23 are schematic diagrams of a circuit in which the various probe embodiments of the invention may be utilized.

FIG. 22 illustrates a circuit in which the capacitance between the probe electrodes, e.g., the probe electrode 66 of FIGS. 10 and 11, the ground is measured. The circuit includes a fixed frequency RF oscillator 130 which drives a bridge network 132 through a transformer 134 where the secondary of the transformer forms one side of the bridge 132. The capacitance sensed by the probe electrode is represented by a variable capacitor 136 which is connected between a capacitor 138 and ground. Any variation in the capacitor 136 which represents the change in the level of the liquids being measured produces a signal across a span capacitor 140 and the signal across the span capacitor 140 may be applied to an amplifier 142 to generate a guard potential and an output terminal 144 which is equal to the potential of the probe electrode.

Figure 19:
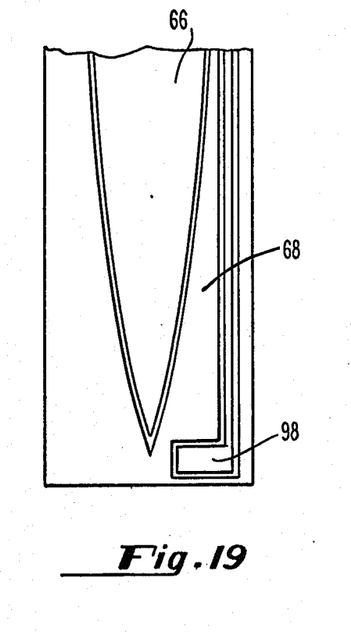
FIG. 19 is a sectional view of a probe similar to that of FIGS. 10 and 11 including an additional electrode measuring variations in the dielectric current of the exterior insulation.
Figure 23:
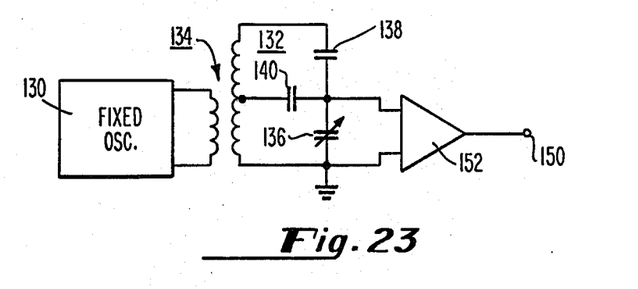
Figure 24:
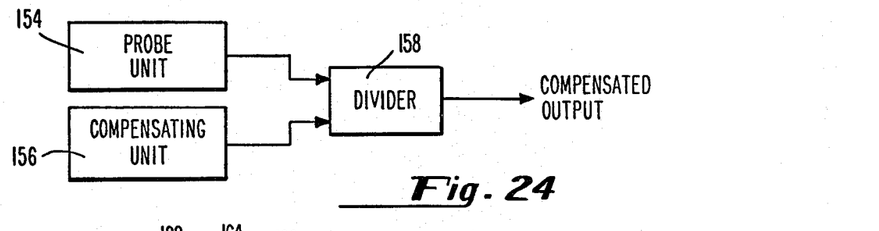
FIG. 24 is a block diagram of circuitry which may be utilized in conjunction with a probe of the type shown in FIG. 19.

In some instances, the guard electrode may be driven at a potential which does not equal the potential of the probe electrode at all times. This may be achieved by connecting the junction of the span capacitor 140 and the secondary of the transformer 134 to the guard electrode at an output terminal 148. The potential at the terminal 148 will equal the potential at the probe electrode when the bridge is balanced. In the circuit of FIG. 23, the potential for the guard electrode is obtained at the output terminal 150 of an amplifier 152 which is connected across the probe electrode 136.

Where the probe includes a compensating electrode 98 as shown in the probe of FIG. 19, additional circuitry must be provided in order to provide a compensated output signal. Such circuitry is shown in FIG. 24 wherein a probe unit 154 represents the circuitry shown in FIG. 22 and the output from the probe unit 154 represents the signal across the span capactor 140. A similar circuit wherein the measured probe capacitance 136 is replaced by the capacitance between the compensating electrode 98 of the probe in FIG. 19 and ground is shown as a compensating unit 156 in FIG. 24. The output from the probe unit 154 and the output from the compensating unit 156 are then applied to a divider 158 which produces a compensated output signal which is unaffected by changes in the dielectric constant of the probe exterior insulation.

In the foregoing, a good deal of emphasis has been placed upon the significance of the frontal guard electrodes or frontal portions of the guard electrode. However, the rear guard electrode or rear portion of the guard electrode is also of considerable importance as will be clear from the following numerical example for the probe of FIG. 25. As shown there, the probe comprises front exterior insulation 160 having a capacitance $C_a$ where the insulation 160 covers a probe electrode 162. Interior insulation 164 separates the probe electrode 162 from a guard electrode 166 where the capacitance $C_b$ represents the capacitance through the insulation 164. Rear insulation 168 covers the guard electrode 166. As also shown in FIG. 25, the thickness through the insulation 160 is $d_a$ and the thickness through the insulation 164 is $d_b$.

Figure 25:
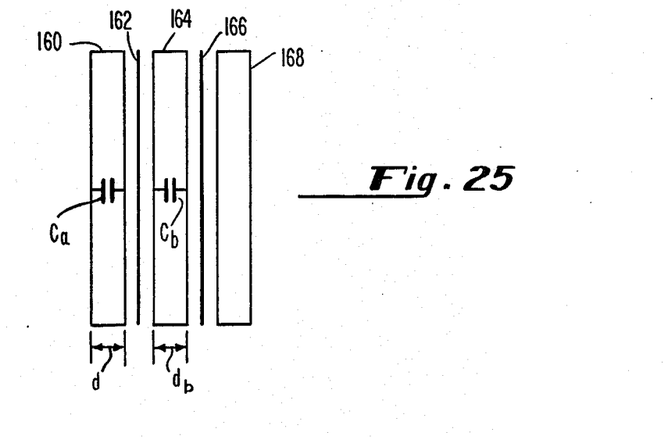
FIG. 25 is a schematic diagram utilized to explain the importance of a rear guard electrode.

Assume the probe of FIG. 25 is to measure liquid levels in a parshall flume and the probe has an active length of approximately 24 inches. Also assume that the probe is linear and is one inch wide.

For such a probe, the capacitance $$C=(K_8 AK_9/d)=0.235(AK_9/d) \qquad (8)$$

where
C = capacity in pf;
$K_8$ = constant;
A = the area in square inches;
d = the spacing in inches; and
$K_9$ = dielectric constant of insulation.

Assume the dielectric constant $K_9$ of the material is 2.5 and the thickness $d_a$ and $d_b$ of the insulation 160 and 164 is 0.020 inches. From the foregoing, the capacitance $C_a$ may be calculated by the following equation:

$$C_a = 29.4L \qquad (9)$$

where L is the length of the probe which is covered by the liquid in the flume.

Assume the probe is to be used for a 4 inch maximum head, corresponding to a full scale reading, such that $$C_a=(29.4)(4)=117.5 \text{ pf.} \qquad (10)$$

By similar calculations, the capacity $C_b$ equals $$C_b = \frac{(.235)(2.5)(1)(24)}{.020} \qquad (11)$$

or $$C_b = 705 \text{ pf.} \qquad (12)$$

$C_b$ is the standing capacity of the probe and is higher than $C_a$ as calculated above because 24 inches of the probe contributes to $C_b$ where only 4 inches contributes to $C_a$.

If it is assumed that the dielectric constant $K_9$ of the insulation 164 varies 5% over a 70° F. temperature range, the variation in $C_b$ would be 35.3 pf. and this would be equivalent to a 30% shift in the zero of the system. If it were desirable to keep the error due to the standing capacity to 3%, insulation thickness $d_b$ would have to be ten times thicker so that $C_b$ equals 70.5 pf. and a 5% change in the dielectric constant $K_9$ would produce a 3.5 pf. error, representing approximately a 3% error in the standing capacity.

Therefore, if the guard electrode 166 is driven at ground potential, there is a limit as to how thin the probe may be made. In the above numerical example, the probe would be limited to a thickness of 0.25 inches. Moreover, if the active length of the probe were longer, the probe would have to be even thicker and increases in thickness of the probe may be undesirable where the probe is intended to be mounted flush against the wall of a flume or vessel so as to minimize interference with the flow through the vessel or flume. However, by driving the guard electrode 166 at guard potential, the capacitance $C_b$ drops out of the measuring equation and the probe can be made as thin as the particular application requires. It should be appreciated that the use of a rear guard electrode is particularly important where the guard is removably mounted in a track since it is virtually impossible to prevent the collection of a liquid behind the probe in such a track.

Although specific embodiments of the invention have been shown and described, it will be understood that various modifications may be made without departing from the true spirit and scope of the invention as set forth in the appended claims.

What is claimed is:

1. A probe system for measuring the level of a liquid comprising:
   a vessel having a wall;
   a probe including a conductive probe electrode extending longitudinally along the probe and insulation covering said probe electrode;
   track means in the vessel adapted to removably receive the probe; and a groove associated with said track means and said probe for guiding the probe along a predetermined path.

2. The probe system of claim 1 wherein the probe is flexible along the longitudinal length thereof so as to conform with any curvature in the predetermined path.

3. The system of claim 1 wherein the predetermined path comprises a curvature such that the probe extends in the vertical and horizontal direction.

4. The system of claim 1 wherein the vessel comprises a flow channel and said guide means is mounted on a surface of said flow channel, said probe electrode being characterized by the equation $$b = K\alpha h(a-1)$$

where
b = the lateral dimension of the probe electrode;
K = a constant;
$\alpha$ = a constant depending upon the curve of the wall in the flow channel; and
h = the height that the probe electrode extends above the zero flow level in the flow channel.

5. The system of claim 4 wherein said surface comprises a curvature.

6. The system of claim 5 wherein said vessel comprises a circular pipe formed in part by said surface.

7. The system of claim 1 wherein said groove comprises continuous surfaces extending along the length thereof.

8. The system of claim 1 wherein said groove comprises substantially continuous edges adapted to cover the lateral extremities of said probe with a central opening exposing said probe substantially along the longitudinal length of said probe.

* * * * *

UNITED STATES PATENT AND TRADEMARK OFFICE
CERTIFICATE OF CORRECTION

PATENT NO. : 4,166,388
DATED : September 4, 1979
INVENTOR(S) : Sun et al

It is certified that error appears in the above-identified patent and that said Letters Patent are hereby corrected as shown below:

Column 11, line 64, Equation (5), before $[2\oint R]$, insert -- H1 = --.

Column 12, line 13, Equation (7), before $[2\oint R]$, insert -- H1 = --.

Signed and Sealed this

Twenty-fifth Day of December 1979

[SEAL]

Attest:

*Attesting Officer*

SIDNEY A. DIAMOND
*Commissioner of Patents and Trademarks*

REEXAMINATION CERTIFICATE (1703rd)
United States Patent [19]
Sun et al.

[11] B1 4,166,388
[45] Certificate Issued May 19, 1992

[54] RF ADMITTANCE MEASURING METHOD AND APPARATUS FOR DETERMINING THE LEVEL OF A CONDUCTIVE LIQUID

[75] Inventors: Robert J. Sun, Bala Cynwyd; Frederick L. Maltby, Jenkintown, both of Pa.

[73] Assignee: Drexelbrook Controls, Inc., Horsham, Pa.

Reexamination Request:
No. 90/002,407, Aug. 21, 1991

Reexamination Certificate for:
Patent No.: 4,166,388
Issued: Sep. 4, 1979
Appl. No.: 859,475
Filed: Dec. 12, 1977

Related U.S. Application Data

[62] Division of Ser. No. 532,208, Dec. 12, 1974, Pat. No. 4,064,753.

[51] Int. Cl.⁵ .................................. G01F 23/26
[52] U.S. Cl. .......................... 73/304 R; 73/304 C
[58] Field of Search ................ 73/304 R, 215, 304 C

[56] References Cited

U.S. PATENT DOCUMENTS

1,735,892 11/1929 Clausen et al. ................... 33/296

FOREIGN PATENT DOCUMENTS

795189 5/1959 United Kingdom.

OTHER PUBLICATIONS

Plasti-Fab Bulletin PF-7, Plasti-Fab Inc., Beaverton, Ore. (no date).

*Primary Examiner*—William A. Cuchlinski, Jr.

[57] ABSTRACT

Various probes which are adapted to measure the liquid level in a vessel including the flow rate through a channel comprise a conductive probe electrode and guard electrode means including a rear portion located between the wall of the vessel and the probe electrode and a lateral portion extending outwardly from the lateral extremities of the probe electrode. The probe electrode and the guard electrode means are separated by interior solid insulation and an exterior solid insulation covers the probe so as to separate the guard electrode means and the probe electrode from the conductive liquid. By driving the guard electrode means at substantially the same potential as the probe electrode, the portion of a conductive coating which has accumulated at the lateral portions of the guard electrode means may be capacitively coupled to the potential of the guard electrode means thereby reducing the adverse effect of a conductive coating which has accumulated at the probe electrode.

REEXAMINATION CERTIFICATE ISSUED UNDER 35 U.S.C. 307

AS A RESULT OF REEXAMINATION, IT HAS BEEN DETERMINED THAT:

The patentability of claims 1-8 is confirmed.

* * * * *